March 19, 1935.   C. J. WINKLER ET AL   1,994,800
HYDRAULIC SWITCH CONTROL
Filed Aug. 14, 1933   2 Sheets-Sheet 1
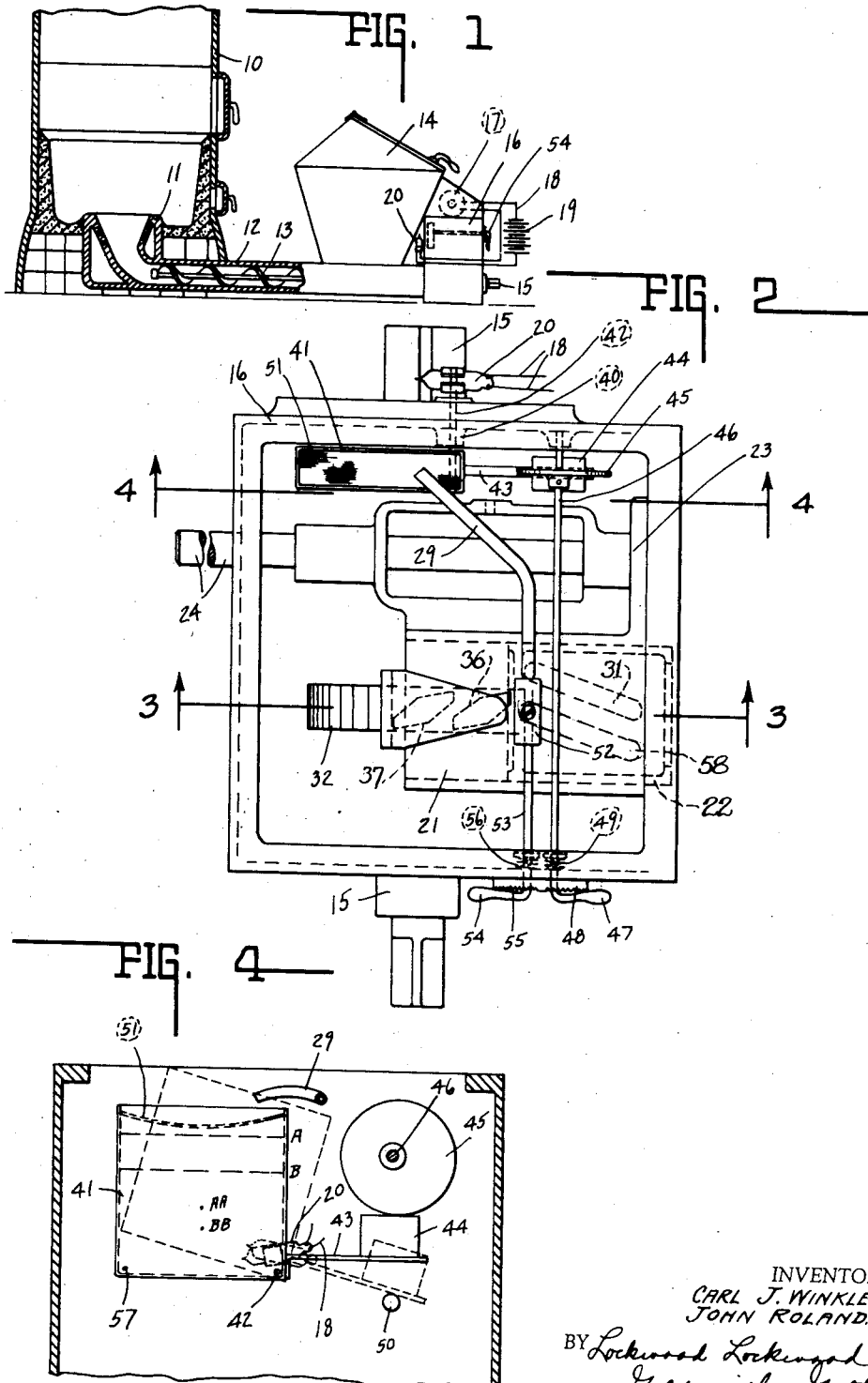
INVENTORS.
CARL J. WINKLER
JOHN ROLAND.
BY Lockwood Lockwood
Goldsmith & Galt
ATTORNEYS.

March 19, 1935.  C. J. WINKLER ET AL  1,994,800
HYDRAULIC SWITCH CONTROL
Filed Aug. 14, 1933   2 Sheets-Sheet 2
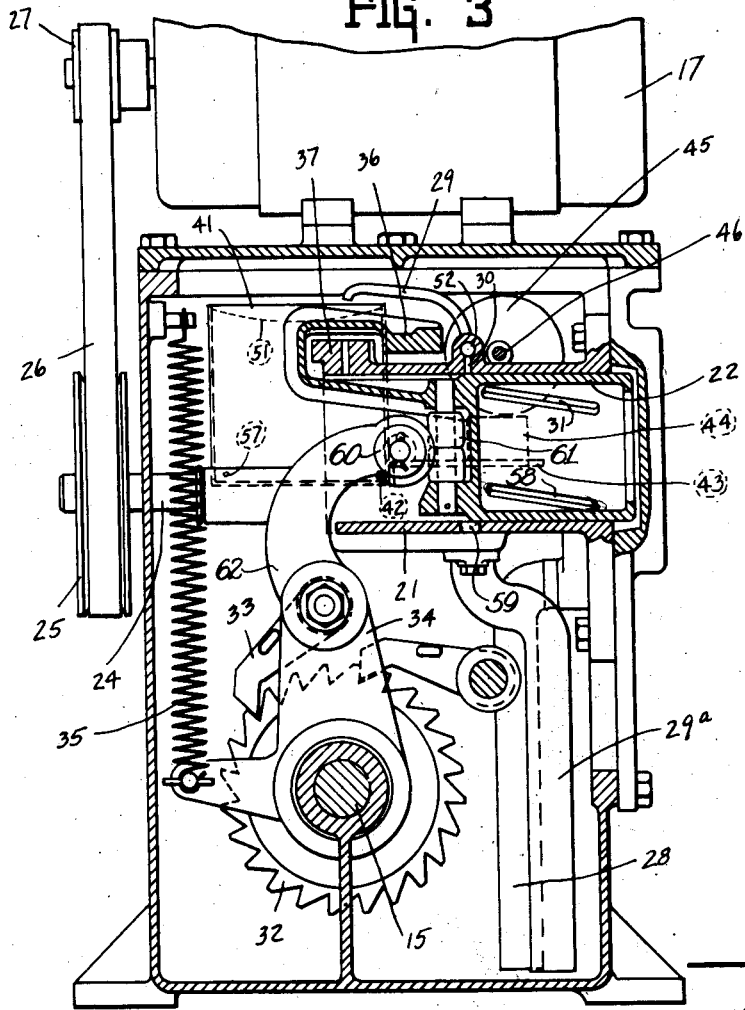
INVENTOR.
CARL J. WINKLER.
JOHN ROLAND.
BY Lockwood Lockwood Goldsmith & Galt
ATTORNEYS.

Patented Mar. 19, 1935

1,994,800

UNITED STATES PATENT OFFICE 1,994,800

HYDRAULIC SWITCH CONTROL

Carl J. Winkler and John Roland, Indianapolis, Ind., assignors to Schwitzer-Cummins Company, Indianapolis, Ind., a corporation Application August 14, 1933, Serial No. 685,144

10 Claims. (Cl. 172—239)

This invention relates to a hydraulic switch control, particularly adaptable for use in connection with fuel stokers or the like, wherein it is desired to automatically close the circuit for operating the stoker feed to maintain a kindling fire in the furnace.

In operating coal or coke stokers for furnaces, and particularly those adapted for domestic use, it is customary to automatically control the feed of the stoker by a remotely located thermostat which causes operation of the stoker when heat is required. In addition thereto, it is necessary to maintain a kindling fire in the furnace, to prevent the fire from going out, by means of an auxiliary circuit control, which will close the circuit and operate the stoker independently of the thermostat or heat requirements. This has usually been accomplished by clock mechanism for operating a time controlled switch which is an expensive installation.

It is the object of this invention to automatically control the feeding of the stoker independently of heat requirement for maintaining a kindling fire. The stoker is hydraulically operated and may be used in conjunction with a hydraulic power transmission, such as disclosed in the application of Carl J. Winkler and Herman E. Winkler, filed December 21, 1932, Serial No. 648,229, for Hydraulic power transmission and timing control therefor. However, the hydraulic switch control, as disclosed herein, may be employed with other forms of transmission, requiring merely the connection of a fluid pump driven from the motor or other power source of the stoker.

The particular feature of the invention resides in its ability to operate the stoker to maintain a kindling fire depending upon the thermostatic or heat requirements rather than independently thereof, as heretofore. Thus, in the usual time control operating independently of heat requirement, the periodic actuation of the stoker may occur immediately after heat control operation, thus further boosting the temperature beyond that required. As distinguished therefrom, the kindling control of this invention is dependent upon the other operation of the stoker and will only occur after a substantial time interval. As an example, assuming that adjustment is made so that the kindling operation will be effective at about every thirty minutes, during which the thermostatic control comes into play and operates the stoker, then the kindling control will not be effective until substantially thirty minutes after the thermostatic control has ceased to operate. Whatever the time element may be, with slight variations, the kindling control will not operate until the expiration of such time after the heat control operation.

More specifically the circuit through the driving motor of the stoker is controlled by a mercury switch or the like, which is tilted to make or break the circuit depending upon the quantity of oil or other fluid contained in the control device. The duration of the feeding operation may thus be controlled by the time required for filling the container by the pump operated during the operation of the stoker, whereas the interval between stoker operations may be controlled by the time required for draining the fluid from the container. Such operations or intervals may be varied by suitable adjustments affecting the time required to fill the container and the time required to empty it. These results may be accomplished by varying the center of gravity of the liquid content of the container; by employing a float operated through the variation in level of the liquid; or by actuating a piston hydraulically, as will be hereinafter more specifically set forth and described.

The full nature of the invention will be understood from the accompanying drawings and the following description and claims:

In the drawings, Fig. 1 is a diagrammatical illustration of a furnace and stoker showing the control circuit. Fig. 2 is a plan view looking down on the power transmission with the top thereof removed. Fig. 3 is a section taken on the line 3—3 of Fig. 2. Fig. 4 is a section taken on the line 4—4 of Fig. 2. Fig. 5 is a diagrammatical illustration showing a modified form of the switch control. Fig. 6 is a diagrammatical illustration showing a second modified form thereof.

In the drawings there is illustrated a furnace 10 having an underfed fire pot 11 into which fuel is fed by the usual feed screw 13 through a conduit 12. A hopper 14 for containing a charge of fuel is mounted above the feed conduit and in communication therewith, whereby fuel may fall by gravity into the conduit and be fed into the furnace 11 by the feed screw in the usual manner.

The feed screw is driven by a shaft 15 from a power transmission mounted in a housing 16. The source of power from the power transmission resides in an electric motor 17 connected in a circuit 18. Current for the circuit is received from the source 19. A mercury switch 20 is provided in the circuit for controlling the kindling fire to prevent the fire from going out under certain conditions. The particular type of power transmission disclosed herein for illustrative purposes includes within the housing 16 a cylinder 21 in which a piston 22 is adapted to reciprocate. Communicating with the cylinder there is a fluid pump 23 driven by a shaft 24 from a pulley 25 which in turn is driven by a belt 26 from a pulley 27 on the motor 17.

The fluid pump is fed from an intake conduit 28 extending downwardly to a point near the bottom of the housing which is partially filled with fluid, such as oil. The fluid therein is partially exhausted through the main exhaust pipe 29a communicating with the lower portion of the cylinder, and an auxiliary exhaust pipe 29 communicating with the top of the cylinder. The exhaust pipe 29 communicates with an auxiliary exhaust port 30 in the top of the cylinder with which an elongated auxiliary exhaust port 31 in the top of the piston registers at the end of the power stroke.

The shaft 15 of the feed screw 13 is provided with a ratchet wheel 32 engaged by a pawl 33 pivotally mounted on a power transmitting lever 34 operated by the piston 22 during the power stroke thereof, the piston being returned by the tension springs 35 upon registry of the main exhaust ports 58 and 59 in the lower portion of the piston and cylinder, respectively. Said main exhaust ports are caused to register by an oscillatory movement of the piston caused by an arm 36 carried thereby engaging with a projection 37 on the cylinder.

The operation of the power transmission is as follows: The motor 17 drives the shaft 24 extending through the housing 16. Said shaft operates the fluid pump 23 to force fluid from the bottom of the housing through the intake conduit 28 into the cylinder 21 and hollow piston 22 for operating said piston on its power stroke. At the beginning of the power stroke, the piston 22 is in the position shown in Fig. 3. It is provided in the lower portion thereof with the elongated angularly-disposed exhaust port 58 adapted to register during the exhaust stroke of the piston with the port 59 in the lower portion of the cylinder.

In the position of the piston shown in Fig. 3, at the beginning of its power stroke, the main exhaust ports 58 and 59 are out of registry, as well as the auxiliary exhaust ports 30 and 31. The fluid pumped into the cylinder and piston, having no escape therefrom, forces the piston through its power stroke to operate the ratchet 32 and the shaft 15. As it moves through its power stroke, the cam 36 on the piston engages cam 37 on the cylinder so as to partially rotate the piston within the cylinder for maintaining the angularly-disposed elongated ports 31 and 58 out of registry with their respective ports 30 and 59. Upon the cam 36 passing the cam 37, the tension exerted between the rollers 60 and 61 mounted on the lever 62 and piston 22, respectively, under tension of the spring 35, tends to return the partially rotated piston to its normal position which brings the main exhaust ports 58 and 59 into registry, as well as the auxiliary exhaust ports 30 and 31. Thereupon, the fluid is exhausted from the piston and cylinder through the exhaust pipe 29a, permitting the spring 35 to return the piston during the exhaust stroke. As the piston recedes, the cam 36 engages the opposite side of the cam 37 to partially rotate the piston in the opposite direction to that of its power stroke so as to maintain the elongated angular ports 31 and 58 in registry with the ports 30 and 59, respectively, during the entire exhaust stroke.

Pivotally supported upon the bearing 40 in the housing 16 there is a container 41. The container is pivotally supported within the bearing 40 by a pin 42 extending through the bearing and casing upon which the mercury switch 20 is mounted. Adjacent the pivotal side of the container there is a laterally-extending arm 43 having an adjustable counterweight 44 on the end thereof for substantially balancing the container upon its pivotal mounting. Mounted immediately above the counterweight 44 there is a cam 45 eccentrically mounted upon a shaft 46 which extends through the housing and is provided exteriorly of the front wall thereof with a handle 47 operable to rotate the cam. The handle may be held in adjusted position, by serrations in the quadrant 48 through the medium of a spring 49, whereby said cam may be adjusted to any desired position for the purpose hereinafter described. Below the counterweight there is provided a stop 50 secured to the side wall of the housing to limit the downward movement of the arm 43 and thereby the tilting movement of the container about the pivot 42. Thus, the cam limits the tilting movement in one direction while the stop limits it in the opposite direction.

The contaner is open at the top and provided with a wire mesh strainer 51. The oil exhaust pipe 29 has a discharge spout over the container, but spaced therefrom to permit free tilting movement. A valve 52 is provided adjacent the exhaust port 30 of the cylinder for controlling the amount of oil discharged through the exhaust pipe 29, and by-passing the balance to permit free discharge into the oil sump of the housing. The valve 52 is operated through the medium of a valve rod 53 which extends through the front of the housing and is connected with a hand lever 54 which operates in a notched quadrant 55, being held in adjusted position by a spring 56. The container is provided at the opposite side thereof from the pivotal mounting 42 with a small drain hole 57 adjacent the bottom. When the container is filled with oil by the auxiliary exhaust pipe 29, the weight of the oil holds it in substantially vertical position and the mercury switch 20 is in circuit breaking position. When the oil has partially drained from the container through the drain hole 57, the weight 44 causes the container to tilt, which in turn tilts the mercury switch 20 to close the circuit.

In operation, the stoker is at rest and no fuel is fed into the fire pot when the container 41 contains oil at a given level as indicated at A, the center of gravity being indicated at AA. In this position the circuit 18 is broken by the position of the mercury switch 20. Oil will drain through the drain hole 57 into the oil sump of the housing, thereby lowering the oil to the level B, and the center of gravity to the point BB. Upon the center of gravity reaching this point, the balance between the center of gravity and the counterweight 44 will be upset and the counterweight will cause the container to tilt clockwise, see Fig. 4, about the pivotal mounting 42 to the position illustrated by dotted lines. This movement will be limited by the counterweight engaging the stop 50. Upon the container being thus tilted, the mercury switch is correspondingly tilted to close the circuit through the electric motor 17.

Upon the motor being energized, it will drive the pump 23, which will pump oil from the sump of the housing into the cylinder 21, forcing the piston forwardly to drive the ratchet 32 through the lever 34 and pawl 33. The ratchet will rotate the shaft 15 which will feed fuel from the hopper 14 to the fire pot 11 by the screw 13. At the end of the power stroke the exhaust ports 30 and 31 will register, exhausting a controlled portion of the oil through the auxiliary exhaust pipe 29 into the container 41. Thus, upon each return stroke of the piston a predetermined controlled quantity of oil will be discharged into the container until the oil level and center of gravity of the container are raised sufficiently to overbalance the counterweight 44 and cause the container to tip back to its original position. This movement will tilt the mercury switch to break the circuit 18, deenergize the motor, and stop the feeding of fuel.

The cycle will then be repeated, wherein the oil will drain through the drain hole 57 until the container again tilts and closes the circuit. The continued drainage of oil from the container while it is in tilted position, together with the shifting of the center of gravity, will necessitate a substantially higher level of oil therein for returning it from tilted position to its normal position.

From the foregoing it will be noted that the interval between feeding operations will be controlled in duration by the drainage of oil. The duration of the feeding operation will be controlled by the exhausting of the oil from the cylinder into the container. These periods of action and inaction may be controlled through the setting of the handles 47 and 54. The handle 47 operates the cam 45 engaged by the counterweight 44 so as to vary the normal position of the container and its center of gravity. Thus, when the cam is moved to position to permit slight elevation of the counterweight, the center of gravity will be so shifted as to require a lower level of oil before operation by the counterweight, thereby increasing the interval between operations. By turning the cam in the opposite direction for lowering the normal position of the counterweight, less oil will have to be drained for tilting the container, thereby reducing the interval between operations.

The duration of the feeding operation may be increased by operating the handle 54 to reduce the opening of the valve 52, allowing less oil per stroke of the piston to be discharged into the container, thus requiring a longer time to lift the oil level and center of gravity. By moving the handle in the opposite direction, a greater amount of oil will be discharged which will more rapidly fill the container and thereby decrease the duration of the feeding operation.

In the modified form illustrated in Fig. 5, there is shown a fixed container 141 having a vertical rod 142 upon which a float 143 is slidably mounted, which float seeks the level of oil or other fluid contained therein. An actuating rod 144 is operated by the float for engaging and tilting the mercury switch 120 through the medium of a lever 145. Oil is discharged into the container from a discharge pipe 146 which is controlled by a hand lever 147. A source of oil supply to the discharge pipe may be provided by the exhausting of the cylinder 121, as above described, or directly from an oil pump such as above described as being driven by the electric motor 17. The container is provided with a variable drain hole 151 for lowering the level of the oil therein.

The feeding operation of the stoker will be initiated by the tilting of the mercury switch to circuit closing position upon the float reaching its lowermost limit due to the drainage of oil through the oil hole, a nut 152 being adjustable on the end of the switch. The duration of the feeding operation of the stoker will depend upon the time required to raise the oil level in the container, which time may be controlled by a valve 147 and the adjusted position of the nut 153 which engages the lever 145 to move it in reverse direction to break the circuit.

Thus, a hydraulic control is provided which may be operated from the exhaust of the hydraulic power transmission in the stoker, or may be directly operated from an oil or liquid pump.

In the modified form illustrated in Fig. 6, there is provided a cylinder 241 in place of a container in which the piston 242 is adapted to operate. Said piston is provided with a stem 244 for controlling the mercury switch 220 through the medium of the arm 245. The stem is provided with adjustable nuts 252 and 253 for varying the length of the stroke between operations of the switch, as above described. An adjustable oil drain 251 is provided for draining the oil during the interval between operations of the stoker when the switch is open, and an oil feed line 246 having a control valve 247 is provided with a check valve 248 for feeding oil into the cylinder to raise the piston during the operation of the stoker. Such operation will force oil into the cylinder through the medium of the power transmission cylinder, as above described, or an oil pump driven from the electric motor may be employed with any type of stoker feed transmission.

The invention claimed is:

1. A control for motors consisting of a motor operating circuit, a fluid container, means for pumping fluid to said container by the motor, means for draining said container, a switch in said circuit operated by variations in level of the fluid in said container, adjustable means for regulating the quantity of fluid required to be drained from the container for operating the switch in one direction, and adjustable means for varying the rate of supply of fluid to the container to raise the level thereof for actuating the switch in the opposite direction.

2. A control for motors consisting of a motor operating circuit, a hydraulic power transmission having a fluid containing housing, a container pivotally mounted within said housing for containing a quantity of fluid and having a drain therein, a switch for controlling said circuit, said switch being operably connected with said container, a fluid pump in said housing driven by the motor for pumping fluid from the bottom thereof, a cylinder into which said fluid is pumped, a piston actuated by fluid pumped into said cylinder, an exhaust port in said cylinder for discharging fluid into said container upon the exhaust stroke of the piston, a valve for controlling the fluid discharged into said container at each stroke, and a cam adjustable to control the pivotal movement of said container.

3. A control for motors consisting of a motor operating circuit, a control switch for said circuit, a fluid container, means for causing fluid to be pumped to said container by the motor, said container having a fluid drain therein, means operably connected with said switch for closing the circuit upon the fluid reaching a predetermined low level and breaking the circuit upon it reaching a predetermined high level, and adjustable means for causing said switch to be moved to circuit breaking position at different levels of fluid in the container to control the amount of fluid required to be drained therefrom during the interval between motor operations.

4. A control for motors consisting of a motor operating circuit, a control switch for said circuit, a fluid container, means for causing fluid to be pumped to said container by the motor, said container having a liquid drain therein, means operably connected with said switch for closing the circuit upon the fluid reaching a predetermined low level and opening the circuit upon it reaching a predetermined high level, adjustable means for controlling the rate of supply of fluid to said container during operation of the motor, and adjustable means for causing said switch to be moved to circuit breaking position at different levels of fluid in the container to control the amount of fluid required to be drained therefrom during the interval between motor operations.

5. A control for motors consiting of a motor operating circuit, a control switch for said circuit, a pivotally mounted container operably connected with said switch, said container being provided with a drain, means for supplying fluid to said container during the operation of the motor to a high level for moving it to circuit breaking position, the drainage of fluid thereafter causing it to move to circuit closing position upon the fluid reaching a predetermined low level, adjustable means for permitting movement of said container at varying predetermined fluid levels, and adjustable means for varying the rate of supply of fluid to said container for controlling the operation.

6. A control for motors, including a motor-operating circuit, a pivotally-mounted liquid container having a drain therein, a switch for controlling said circuit operably connected with said container, a fluid pump driven by the motor, a cylinder into which said fluid is pumped, and a piston actuated by the fluid pumped into said cylinder, said cylinder having an exhaust port through which fluid is discharged into said container during the stroke of the piston.

7. A control for motors, including a fluid pump driven by the motor to be controlled, a cylinder into which fluid is pumped, a piston operable in said cylinder by the fluid pumped therein, a fluid container associated with said cylinder, said cylinder being provided with a port communicating with said container through which fluid may be discharged therefrom by the operation of the piston, said container having a drain therein for permitting the escape of the fluid therefrom, an electric circuit connected with said motor having a control switch, and means actuated by the variation of the fluid level in said container for operating said switch, whereby the circuit will be closed upon the fluid in the container being drained to a low level and opened upon the fluid being discharged into said container to bring it to a higher level.

8. A control for motors, including a housing containing a quantity of fluid, a fluid pump mounted in said housing driven by the motor, a cylinder for receiving fluid pumped from the bottom of the housing, a fluid container pivotally mounted in said housing provided with a drain, said cylinder being provided with a port communicating with said container for discharging fluid therein, a fluid-actuated piston operable in said cylinder for forcing the fluid from the cylinder to the container, a power circuit connected with the motor having a control switch therein, and means actuated by the tilting movement of the container for closing said switch when tilted to one position by drainage of the fluid and opening said switch when tilted to the opposite position by the weight of the fluid delivered to said container from the cylinder.

9. A control for motors, including a housing for containing a quantity of fluid, a pump driven by said motor and having an intake extending below the fluid level therein, a fluid pressure power transmission associated with said housing actuated by the fluid pumped thereto by said pump, a fluid container mounted in said housing having a drain therein, a power circuit for said motor, means for discharging fluid during the operation of said fluid-actuated power transmission to said container, and means operably connected with said container for closing the power circuit upon a decrease of fluid level therein and breaking the circuit upon an increase of fluid level resulting from the operation of said power transmission.

10. A control for stoker motors, consisting of a motor-operating circuit, a control switch for said circuit, a pivotally-mounted fluid container operably connected with said circuit for breaking the circuit when tilted to one position and opening the circuit when tilted to another position, said container having a drain therein, a pump for pumping fluid into said container during the operation of the motor, and means for varying the normal position of the center of gravity of said container, whereby the quantity of fluid contained therein for actuating it from one position to the other may be varied.

CARL J. WINKLER.
JOHN ROLAND.